Patented June 6, 1944

2,350,521

UNITED STATES PATENT OFFICE 2,350,521

FREE-FLOWING POWDERED SOAP MIXTURE AND ITS METHOD OF PREPARATION

Grady M. O'Neal, Chicago, Ill., assignor to The Sherwin-Williams Company, Cleveland, Ohio, a corporation of Ohio No Drawing. Application March 17, 1943, Serial No. 479,494

18 Claims. (Cl. 106—243)

This invention relates generally to soaps and in particular to a mixture of special water-insoluble metallic soaps formed from both rosinic acid and fatty type acid.

Soaps have hitherto been prepared from an organic acid, such as rosinic or fatty type acid. According to one method, the organic acid is saponified with a suitable agent, such as an alkali, e. g., sodium hydroxide, to form a water-soluble soap, such as sodium soap, and is then treated with a suitable metal salt to precipitate a water-insoluble metallic soap.

In some instances the physical nature of a water-insoluble metallic soap is unimportant to the use to which it is to be put; in others, its successful use depends upon its physical form.

The constitution of an organic acid governs to a great degree the physical properties of a water-insoluble metallic soap made therefrom. In general, it may be stated that rosinic acid tends to give a free-flowing, powdery type of soap, and the fatty type acid tends to give a grease-like soap, the latter being difficult, if not impossible, to convert into a free-flowing powder.

In my cofiled applications, Serial Nos. 479,493, 479,495, 479,496, and 479,498, which applications relate to new azo pigment dyestuffs, coating compositions made therefrom, and methods of manufacturing the same, the improvements resulting from the use of water-insoluble metallic soap of both rosinic acid and fatty type acid, either as two chemically independent soaps, or as a single complex soap, either in physical or chemical combination of the two species thereof, are disclosed. While the present invention relates to the inventions of these cases, it is primarily directed to the production in powdered form of a soap mass having water-insoluble, metallic rosinic acid soap, and water-insoluble, fatty type acid, metallic soap, the mass having special utility when incorporated in both the salt and non-salt forms of azo pigment dyestuffs.

In my cofiled applications, Serial No. 479,493, and Serial No. 479,498, it has been shown that azo pigment dyestuffs, of both the salt and non-salt forms, may be more readily incorporated into a liquid vehicle and produce superior inks or coating compositions when there is present a particular kind of soap mass. It has also been shown that the additional presence of salt electrolyte with such a soap mass further improves the process of incorporating such pigments into liquid vehicles and improves the resulting product in certain important particulars.

The advantages of using two certain types of soap may be accomplished by producing an azo pigment dyestuff which embodies within itself the said soaps, or the salt electrolyte, or both. However, the soap mass may be used alone as a separate ingredient in compounding an ink or a coating composition. Salt electrolyte also may be used as a separate or physically combined ingredient in compounding the pigment and the soap mass into the liquid vehicle. The azo pigment dyestuff, as one ingredient, may be mixed with the soap as another ingredient, with or without salt electrolyte as a third ingredient, to form a compounded pigment mass. The resulting pigment composition may then be used as a "pigment" in a formulation for an ink or a coating composition.

The present invention has for its object the production of a suitable soap mass, with or without included salt electrolyte, for use as an ingredient to improve azo pigment dyestuffs, the coating compositions made therefrom, and the processes of making such useful commercial "pigments" and coating compositions.

It is a particular object of the invention to make a water-insoluble metallic soap using both fatty type acid and rosinic acid.

It is a further object of the invention to produce a mixed soap from both fatty type acid and rosinic acid, which soap is a dry free-flowing powder.

Various other objects and advantages of the invention will become apparent from the following description and explanation of the invention.

The scope of the term "soap" is not clearly defined in the technical literature, and the term is loosely and often improperly employed. Since the present invention involves soaps and their manufacture, I have chosen to define them by defining the acids from which they are derived. To accomplish the purposes of this invention, the soaps employed must be derived from two classes of soap-forming acids which are hereinafter respectively defined as "rosinic acid" and "fatty type acid."

"Rosinic acid," as the term is used in describing the present invention, contemplates rosin and abietic acid; modifications of rosin, such as heat-modified rosin and solvent-extracted rosin; chemical derivatives of rosin, such as hydrogenated rosin or abietic acid; the complex soap-forming acids resulting from the condensation product of rosin or abietic acid with unsaturated aliphatic acids having up to, but not more than, two carboxyl groups, as described hereinafter; and other chemical derivatives of rosin or abietic acid.

The term "fatty type acid," for the purposes of the present invention, contemplates: (1) the various α,β-unsaturated aliphatic acids having up to, but not more than, two carboxyl groups, such as maleic acid, crotonic acid, acetylene dicarboxylic acid, citraconic acid, and the like, which are capable of being condensed with rosin or abietic acid by the Diels-Alder reaction to produce a complex soap-forming acid (as described hereinafter, and also in more detail in my cofiled application Serial No. 479,499); (2) the saturated and unsaturated soap-forming aliphatic acids, which have at least 8 carbon atoms including a carboxyl group carbon in an open carbon chain, such as caprylic acid, ricinoleic acid, oleic acid, linolic acid, linolenic acid, palmitic acid, and the like; and (3) the soap-forming naphthenic acids, defined hereinafter, and others of a cycloaliphatic nature, each carboxyl group of which is attached to the cyclic carbon chain through at least one intermediate carbon atom so that each carboxyl group is part of an aliphatic side chain of at least two carbon atoms. By this last mentioned limitation, I intend to include in this third class of fatty type acids those cycloaliphatic compounds, such as naphthenic acids, in which the carboxyl group is part of an aliphatic radical having at least two carbon atoms (including the carboxyl group carbon) and is not attached directly to a carbon atom of a cyclic carbon chain, and to exclude and differentiate from such compounds as the "rosinic acids," defined above, in which the carbon atom of the carboxyl group of the rosin or abietic acid is attached directly to a carbon atom of a cyclic carbon chain.

It is well known that many of the soap-forming fatty type acids comprising group (2) in the preceding paragraph, both saturated and unsaturated, are found as mixtures in vegetable oils and animal fats, principally in the form of glycerides. Among the vegetable oil acids which are useful in the present invention, for example, are those from the oils of perilla seed, soya bean, sunflower seed, corn, rapeseed, and linseed. A typical analysis of perilla oil acids, to illustrate one class, is as follows:

| Nature of acid: | Percentages |
|---|---|
| Oleic | 4.0–10.5 |
| Linolic | 33.0–44.0 |
| Linolenic | 44.0–49.0 |
| Palmitic (substantially) | 6.5– 8.0 |

The term "fatty type acid" includes in group (1) of the above definition certain short chain acids, such as maleic acid, which are not "soap-forming" acids, as the latter term is generally understood. I wish to make it clear, therefore, that such acids, since they are not alone truly "soap-forming" when reacted to form a metal salt, are not contemplated by the expression "soap of a fatty type acid." However, they are "soap-forming" acids when chemically combined with rosin, and, therefore, are intended to be included as members of the group of "fatty type acids" useful for the purposes of the present invention. When chemically combined with rosin and suitably reacted with a metal, they enter into the formation of a soap which is both rosinic and fatty type acid in nature and which is embraced by the broad terms "rosinic-fatty type acid soap" and "soap of both a rosinic acid and a fatty type acid," as these terms are employed in my related applications referred to above.

Naphthenic acids are secured from petroleum during refining and are defined by "Richter's Organic Chemistry," vol. II (1939), p. 64, essentially as follows: They consist of saturated monocyclic acids of the general formula $C_nH_{2n-2}O_2$, which have been found to be alkylated carboxylic acids of the cyclopentane series up to $C_{12}H_{22}O_2$; of two paraffin-carboxylic acids $C_6H_{12}O_2$ and $C_7H_{14}O_2$; and some bicyclic compounds of the general formula $C_nH_{2n-4}O_2$ ranging from $C_{13}H_{22}O_2$ to $C_{22}H_{40}O_2$.

The term "salt electrolyte" comprehends generally those salts which are water-soluble and substantially neutral when ionized in aqueous solution, in particular the water-soluble salts of the alkali and the alkali-earth metals. While salts of the strong mineral acids, such as hydrochloric and nitric, are most usually illustrated in the following examples, others have been employed, such as salts of sulfuric acid, or salts of weak organic acids (formic, acetic, citric, oxalic and others). Also cations other than the alkali and alkali-earth metals have been used as salts of a variety of acids, such cations being iron, lead, zinc, manganese, copper and others. In general, the choice of the most efficient salt electrolyte for any particular application is best determined experimentally.

The nature of my new soap masses and the manner in which they can be prepared may best be understood by consideration of a number of specific examples, in which parts are given by weight.

*Example 1.*—To an agitated solution at 90° C. produced from 450 parts of water, 9.0 parts of oleic acid, as the sodium salt in a 10% solution in water, and 9.0 parts of the condensation product of about 1 part of maleic anhydride and 6.8 parts of E wood rosin, as the sodium salt in a 10% solution in water, add 10.5 parts of barium chloride ($BaCl_2.2H_2O$) dissolved in 200 parts of water. After 15 minutes agitation, while having attained or maintained the temperature of 90° C., filter off the resulting water-insoluble metallic soap product. Wash thoroughly, dry, and grind to powder.

*Example 2.*—To an agitated solution at 90° C. produced from 450 parts of water; 6.0 parts of WW woood rosin, as the sodium salt in a 10% solution in water; 6.0 parts of the condensation product of about 1 part of maleic anhydride and 6.8 parts of E wood rosin, as the sodium salt in a 10% solution in water; 6.0 parts of crude naphthenic acids, as the sodium salts in a 10% solution in water; add 10.5 parts of barium chloride ($BaCl_2.2H_2O$) dissolved in 200 parts of water. After 15 minutes agitation, while having attained or maintained the temperature at 90° C., filter off the resulting water-insoluble metallic soap, wash free of salt electrolyte, dry, and grind to a powder.

The above soap is an example of soap composed of rosin, a rosin-maleic acid condensation product, and naphthenic acids. It is a white, pulverulent, non-greasy powder, and may be used for blending with azo pigment dyestuffs to give new and improved properties in the coating compositions made therefrom.

*Example 3.*—Example 2 is repeated save that the 10.5 parts of barium chloride ($BaCl_2.2H_2O$) are increased to 14.0 parts, and no washing is practiced after the filtration.

The resulting soap powder, in appearance, closely resembles that of Example 2. It differs, however, in that adhering or occluded salt electrolyte is present as a result of both the elimination of the customary washing step and the increase in the amount of salt precipitant employed. Some sodium salts are likewise included in the salt electrolyte. In some instances, the soap may be used to greater advantage than the soap of Example 2, as in azo pigment dyestuff powders or coating compositions which do not have the pigment in the sodium salt form.

*Example 4.*—Example 2 is repeated, but using as the soluble soaps only a 10% aqueous solution of the sodium salts of 18 parts of naphthenic acids. The resulting precipitated soap is in the form of small curds, and in trying to recover it by filtering and washing, it remains in a gummy or grease-like condition. This soap is not useful for the present invention, and illustrates the fact that, when the rosinic acid is not present up to about 20% of the total acid, the soap tends to become greasier and less pulverulent and not suitable for provision in a dry powder form to mix with powdered pigments.

*Example 5.*—To an agitated solution at 70° C. produced from 450 parts of water; 6.0 parts of perilla oil fatty acids, as the sodium salts in a 10% solution in water; and 12.0 parts of the condensation product of about 1 part of maleic anhydride and 6.8 parts of E wood rosin, as the sodium salt in a 10% solution in water, add 6.3 parts of calcium chloride ($CaCl_2.2H_2O$) dissolved in 200 parts of water. After 30 minutes agitation, the temperature being maintained at 70° C., filter off the resulting insoluble metallic soap, and wash thoroughly.

This soap is derived from soap-forming acids which are approximately one-third fatty type acid and two-thirds rosinic acid, as the calcium salts. It may be dried and then ground to a free-flowing soap powder. Such soap powder may then be mixed with various azo pigment dyestuffs. The resulting azo pigment dyestuff composition, when ground into the usual vehicles, give coating compositions that display enhanced film gloss and finish, better flow, and less tendency to set or body up; and, when used in printing inks in certain applications, better lithographic breakdown resistance.

In the foregoing Examples 1, 2, 3, and 5, the rosinic acid used was either the condensation product of maleic anhydride and rosin, or a mixture of this condensation product and rosin. In place of these ingredients, any one of a wide variety of rosinic acids may be used, as well as mixtures of such acids.

A special class of chemical derivatives of rosin is covered in my cofiled application, Serial No. 479,499, wherein unsaturated, aliphatic acids (including their anhydrides and their esters) containing up to, but not more than, two carboxyl groups, are condensed with rosin by means of a diene or polymerization-condensation type of synthesis. In that application it has been shown that the procedural route for obtaining these desired complex acids is capable of wide variation. In one example, a typical ethylene dicarboxylic acid, in the form of its anhydride, is condensed with rosin to give the complex soap-forming acid directly. In a second example, a typical mixture of unsaturated, long chain, aliphatic, monocarboxylic acids that are common in drying oils is condensed (the glyceride esters of these acids being employed in this instance) with rosin to give a condensation-polymer glyceride ester, this ester being then saponified with alkali to give the desired complex soap-forming acids. It is possible to use other ester forms of these unsaturated aliphatic acids in effecting their condensation with rosin or abietic acid, and it is not necessary that these esters be those of unsaturated, long chain, aliphatic, monocarboxylic acids. For example, it is possible to form the identical maleic acid-abietic acid condensation product obtained by reacting maleic anhydride with abietic acid by condensing, instead, the dimethyl ester of maleic acid with abietic acid to give the ester adduct, and then subsequently saponifying the ester adduct with alkali. All of this is well known. In the case of linseed oil, which is mentioned in the second example just referred to and which is illustrative of the drying oils, two unsaturated aliphatic acids are mainly present—linolic or 9:12-octadecadienoic acid, and linolenic or 9:12:15-octadecatrienoic acid. Linolic acid is an unsaturated, monocarboxylic acid of the general type, $C_nH_{2n-3}COOH$; and linolenic acid is an unsaturated monocarboxylic acid of the general type, $C_nH_{2n-5}COOH$. Hence, it is seen that a large number of complex soap-forming acids capable of forming water-insoluble metallic soaps for the purposes of this invention, are available.

Likewise, any of the soap-forming fatty type acids covered by the definition thereof given above, or mixtures of these acids, may be substituted for the particular fatty type acids named in Examples 1, 2, 3, and 5.

The proportion of fatty type acid to rosinic acid in the mixture of metallic soaps of these acids may vary over a wide range, and variations in it are not appreciably noticeable unless a very small amount of the soap is used with an azo pigment dyestuff. It is more the proportions of rosinic acid soap to pigment, and of fatty type acid soap to pigment, which are controlling. Considering that the mixed soap may be advantageously used in quantity up to 10 parts of soap to 10 parts of pigment, a wide variety of proportions of both fatty type acid and of rosinic acid to pigment are permitted in so far as the improvements in the inks or coating compositions are concerned. However, the extent to which the rosinic acid soap and the fatty type acid soap may be present in a combination soap will determine the character of the soap product. In making soap masses varying from 100% of rosinic acid soap to 100% of fatty type acid soap, it has been found generally that as the fatty type acid content of the soap increases to over about 65% of the total of the two soap-forming acids, the soap becomes greasier and less powdery. When it attains a content of about 85% fatty type acid, the mixed soap combination is so greasy that it cannot be well mixed with pigment to form a free-flowing powder. Also, the content of the rosinic acid becomes so low that the functional effect of it to improve the ink making process and the resulting ink begins to be reduced. However, it is not indicated that from 65% to 85% of the acid content of the soap may not be the fatty type acid. For obtaining a free-flowing powder, it is preferred that the fatty type acid content of the soap be in the neighborhood of 50%, and for the ultimate purposes of improving inks and coating compositions, it is preferred that the fatty type acid content of the soap be not over 80% where at least 20% is the rosinic acid.

Although the above limitations are given in terms of soap-forming acid, they are applicable in a general sense to the respective soap contents, because there is not a sharp line of division with respect to these limitations. The resulting greasiness, to a degree, varies also with the metal of the soap and with the nature of the rosinic acid used in the soap when using a low concentration of rosinic acid soap. The lower limit of 20% rosinic acid content is, therefore, an average limitation prescribed as a safe margin for practice of the invention.

In preparing the soaps of the present invention, it is possible to precipitate the soap with a theoretical quantity of a selected precipitant salt, and then not to wash, whereby the cation of the soluble soap and the anion of the precipitant salt combine to form salt electrolyte, which is retained by not washing. It has been found, however, that where the presence of adhering or occluded salt electrolyte is advantageous, the same cation salt that serves as the precipitant is better employed in excess as a supplier of additional salt electrolyte. In general, it is preferred to use as precipitants, salts of the Group II metals: magnesium, calcium, strontium, and barium. It is possible, however, to use other cation salts, but in some instances, where the coating composition vehicle dries by an oxidation process, certain other metallic soaps tend to function as a drier. Cation salts that have been found to function in this manner are those of iron, manganese, and lead.

The nature and quantity of the salt electrolyte may vary widely. It may be added to the wet soap before drying, or it may be added in powdered form to the finished soap product, although such last-mentioned addition is not preferred.

The use of salt electrolyte in conjunction with the soaps of this invention produces a product of increased utility in the manufacture of various coating compositions. It is believed that the association of the salt electrolyte-soap combination with a pigment, when the pigment is incorporated into a vehicle, gives a more favorable solid (pigment)-liquid (vehicle) interfacial relationship. As a result, improved wetting of the pigment by the vehicle and bettered dispersion are obtained. Also, in certain ink uses, greater emulsion inhibition is secured.

In precipitating water-insoluble soaps with a common cation from a solution of two distinct soluble soaps having the same cation, and different soap-forming acids, it is to be appreciated that three types of soap may result. There may be one in which there is only one of the two acids. There may be another in which there is only the other of the two acids. There may be a third which contains both of the two acids, where the precipitating cation for the soaps is more than monovalent. In the accompanying claims, where soap masses of water-insoluble soaps of fatty type acid and of rosinic acid are referred to, it is contemplated that such soap masses may consist of all three of these types of soaps, as well as variations thereof which are apt to result from the use of more than one fatty type acid or more than one rosinic acid.

While, according to the preferred embodiment of my invention, the two types of soap are simultaneously precipitated from the same solution, I also intend to include within the scope of my invention certain variations of this procedure which will readily occur to one skilled in the art. For example, instead of precipitating both soaps simultaneously, a soluble metallic soap of either the rosinic acid or of the fatty type acid, may first be precipitated by at least a stoichiometric amount of the precipitating salt; the soluble soap of the other may then be added and additional precipitating salt employed to precipitate the second soap in the presence of, and onto, the first, and to supply additional salt electrolyte, if desired. Instead of separately adding the required amount of the precipitating salt for each of the two soap precipitation steps, the total amount required may be added when the first precipitation is brought about, the unused portion thereof remaining for precipitating the second soap as it is added and any excess providing additional salt electrolyte. It is intended to include such procedural variations within the scope of the appended claims.

While the present invention has been illustrated by a number of specific examples, it is to be understood that these have been given merely as illustrations and are not to be construed as limiting the scope of my invention. As has been explained herein, these examples are susceptible to wide variation without losing the advantages of the invention or departing from the scope thereof. In the following claims I intend to cover all such variations as would naturally occur to one skilled in the art.

This application is a continuation in part of my copending applications, Serial Nos. 348,688 and 348,690, filed July 31, 1940; and Serial Nos. 427,919, and 427,920, filed January 23, 1942. The present application is generic to my cofiled application, Serial No. 479,499.

What I claim as my invention and desire to secure by Letters Patent is:

1. A dry, free-flowing, powdery soap mass consisting of water-insoluble metallic soap of "rosinic acid" and water-insoluble metallic soap of a "fatty type acid," the amount of "rosinic acid" being at least one part by weight to four parts by weight of "fatty type acid," said soaps being in intimate association as a result of one having been formed in the presence of the other.

2. A dry, free-flowing, powdery soap mass consisting of soap derived from the simultaneous reaction of water-soluble soap of "rosinic acid" and water-soluble soap of "fatty type acid," both in solution, with a precipitating metallic cation of a chemical compound, whereby water-insoluble soaps of said acids and said cation are precipitated together in intimate association, there being at least 1 part by weight of said "rosinic acid" to 4 parts by weight of said "fatty type acid."

3. A dry, free-flowing, powdery soap mass consisting of water-insoluble metallic soap of "rosinic acid," water-insoluble metallic soap of a "fatty type acid," and a small amount of salt electrolyte associated therewith, there being at least 1 part by weight of "rosinic acid" to 4 parts by weight of "fatty type acid," said soaps being in intimate association as a result of one having been formed in the presence of the other.

4. A dry, free-flowing, powdery soap mass consisting of soap derived from the simultaneous reaction of water-soluble soap of "rosinic acid" and water-soluble soap of "fatty type acid," both in solution, with a precipitating metallic cation of a chemical compound, whereby water-insoluble soaps of said acids and said cation are precipitated together in intimate association, there being at least 1 part by weight of said "rosinic acid" to 4 parts by weight of said "fatty type acid," and a small amount of salt electrolyte physically associated with said soaps.

5. The method of making a dry, free-flowing, powdery soap mass of water-insoluble metallic soaps of "rosinic acid" and "fatty type acid" which comprises forming a solution consisting of water-soluble soaps of the two said types of acids dissolved in water in the proportion of at least 1 part of "rosinic acid" to 4 parts of "fatty type acid," converting said water-soluble soaps to water-insoluble metallic soaps in such manner that one of said insoluble soaps is precipitated in the presence of the other, and recovering and drying the resulting mixture of precipitated soaps.

6. The method of making a dry, free-flowing, powdery soap mass of water-insoluble metallic soaps of "rosinic acid" and "fatty type acid" which comprises forming a solution consisting of water-soluble soaps of the two said types of acids dissolved in water in the proportion of at least 1 part of "rosinic acid" to 4 parts of "fatty type acid," adding an agent providing a precipitating metal cation to precipitate water-insoluble soaps of said acids simultaneously, and recovering and drying the resulting mixture of precipitated soaps.

7. The method of making a dry, free-flowing, powdery soap mass of water-insoluble metallic soaps of "rosinic acid" and "fatty type acid" which comprises forming a solution consisting of water-soluble soaps of the two said types of acids dissolved in water in the proportion of at least 1 part of "rosinic acid" to 4 parts of "fatty type acid," adding a salt providing a precipitating metal cation whereby to precipitate water-insoluble soaps of said acids and to form salt electrolyte in the solution, and recovering and drying the mixture of precipitated soaps while retaining therewith a small amount of salt electrolyte.

8. The method of making a dry, free-flowing, powdery soap mass of water-insoluble metallic soaps of "rosinic acid" and "fatty type acid" which comprises forming a solution consisting of water-soluble soaps of the two said types of acids dissolved in water in the proportion of at least 1 part of "rosinic acid" to 4 parts of "fatty type acid," adding a salt providing a precipitating metal cation whereby to precipitate water-insoluble soaps of said acids and to form salt electrolyte in the solution, separating the resulting precipitated soap from a major portion of said liquid body while retaining the minor portion thereof with the soaps, and drying the separated soap carrying the retained portion of said liquid body whereby to provide a small amount of salt electrolyte in the dried soap.

9. The process of claim 5 in which salt electrolyte which is unreactive with said water-soluble soaps is added at any stage in the process through recovery of the dry, water-insoluble soap mass and is retained therewith in part, at least, to provide a small amount of salt electrolyte in said dry soap mass.

10. The product of claim 1 in which the "fatty type acid" is one selected from the class consisting of saturated and unsaturated aliphatic acids having at least eight carbon atoms and naphthenic acids.

11. The product of claim 1 in which the "fatty type acid" is naphthenic acids.

12. The product of claim 1 in which the "rosinic acid" is a complex soap-forming acid derived from the condensation product of a member of the class consisting of rosin and abietic acid with a member of the class consisting of unsaturated aliphatic acids having up to, but not more than, two carboxyl groups, their anhydrides, and their esters.

13. The product of claim 1 in which the "rosinic acid" is a complex soap-forming acid derived from the condensation of rosin with maleic anhydride.

14. The product of claim 1 in which the "rosinic acid" is selected from the class consisting of rosin and abietic acid.

15. The product of claim 1 in which the "rosinic acid" is a complex soap-forming acid derived from the condensation of rosin with maleic anhydride and the "fatty type acid" is one selected from the class consisting of saturated and unsaturated aliphatic acids having at least eight carbon atoms and naphthenic acids.

16. The product of claim 1 in which the "rosinic acid" is rosin and the "fatty type acid" is one selected from the class consisting of saturated and unsaturated aliphatic acids having at least 8 carbon atoms and naphthenic acids.

17. The product of claim 1 in which the "rosinic acid" is a complex soap-forming acid derived from the condensation of rosin with maleic anhydride and the "fatty type acid" is naphthenic acids.

18. The product of claim 1 in which the "rosinic acid" is rosin and the "fatty type acid" is naphthenic acids.

GRADY M. O'NEAL.